(12) United States Patent
Sobran et al.

(10) Patent No.: US 10,769,057 B2
(45) Date of Patent: Sep. 8, 2020

(54) IDENTIFYING POTENTIAL ERRORS IN CODE USING MACHINE LEARNING

(71) Applicant: International Business Machines Corporation, Armonk, NY (US)

(72) Inventors: Alexander Sobran, Chapel Hill, NC (US); Bo Zhang, Cary, NC (US); Bradley C. Herrin, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 15/975,512

(22) Filed: May 9, 2018

(65) Prior Publication Data

US 2019/0347188 A1  Nov. 14, 2019

(51) Int. Cl.
*G06F 11/36* (2006.01)
*G06F 11/34* (2006.01)
*G06F 8/73* (2018.01)
*G06N 20/00* (2019.01)

(52) U.S. Cl.
CPC .......... *G06F 11/3692* (2013.01); *G06F 8/73* (2013.01); *G06F 11/3476* (2013.01); *G06N 20/00* (2019.01)

(58) Field of Classification Search
CPC ............. G06F 11/0766; G06F 11/3476; G06F 11/0775; G06F 11/0793; G06F 11/3692; G06F 8/73
See application file for complete search history.

(56) References Cited

U.S. PATENT DOCUMENTS

| | | | |
|---|---|---|---|
| 8,850,260 B1* | 9/2014 | Fuller | G06F 11/0727 714/3 |
| 9,367,383 B2 | 6/2016 | Henley et al. | |
| 9,378,014 B2 | 6/2016 | Wilson et al. | |
| 9,542,176 B2 | 1/2017 | Bird et al. | |
| 9,760,365 B2 | 9/2017 | Johansson et al. | |
| 10,152,407 B1* | 12/2018 | Zachesov | G06F 11/3692 |
| 2014/0053135 A1* | 2/2014 | Bird | G06F 8/71 717/124 |
| 2015/0033202 A1* | 1/2015 | Wilson | G06F 8/36 717/106 |
| 2015/0378718 A1* | 12/2015 | Johansson | G06F 8/70 717/172 |
| 2016/0092286 A1* | 3/2016 | Henley | G06F 16/248 714/57 |

(Continued)

*Primary Examiner* — Yolanda L Wilson
(74) *Attorney, Agent, or Firm* — Robert A. Voigt, Jr.; Winstead PC (57) ABSTRACT

A method, system and computer program product for identifying potential errors in a software product after it is built but prior to release. Negative log reports of previously-build software products containing errors in the code in connection with building these software products are identified. The language of the negative log reports is then vectorized and the vectorized negative log reports are then stored. After vectorizing the language of a build log report upon completion of a build of a software product, the vectorized log report is compared with the stored vectorized negative log reports. The release of the software product will then be halted and the programmer will receive a copy of the negative log report associated with the vectorized negative log report closest in distance to the vectorized log report if the vectorized log report is within a threshold amount of distance to a stored vectorized negative log report.

20 Claims, 4 Drawing Sheets

(56) References Cited

U.S. PATENT DOCUMENTS

2016/0110238 A1\* 4/2016 Burugula ............ G06F 16/9024
                                                          714/38.11
2016/0292592 A1\* 10/2016 Patthak ............... G06F 3/04842
2017/0068526 A1\* 3/2017 Seigel ....................... G06F 8/61

\* cited by examiner

IDENTIFYING POTENTIAL ERRORS IN CODE USING MACHINE LEARNING

TECHNICAL FIELD

The present invention relates generally to software development, and more particularly to identifying potential errors in the code after it is built but prior to release using machine learning.

BACKGROUND

Software development is the process of conceiving, specifying, designing, programming, documenting, testing, and bug fixing involved in creating and maintaining applications, frameworks, or other software components. Software development is also a process of writing and maintaining the source code. The writing of the source code may be referred to as "building" the software. The process of building a computer program is usually managed by a build tool, a program that coordinates and controls other programs. Examples of such programs are Meister by OpenMake® Software, Apache Ant™, Rake, etc.

In building the computer program, a process referred to as "continuous integration," may be utilized in which all the software developers' changes to the computer program are tested and reported when they are added to the mainline code base, which may be several times a day. Furthermore, in connection with building the computer program, software tools may be used to debug (process of finding and resolving defects or problems within a computer program that prevent correct operation of the computer software or system) the built computer program during the continuous integration phase prior to being released. Debugging of the built computer program requires extensive knowledge and experience with such software tools by the software developers. In particular, extensive knowledge and experience is necessary to understand the tools as well as the error messages provided by the tools. The failure points become more complex as the build grows in complexity thereby typically requiring a small dedicated team or a software engineer with extensive years of experience in these environments and tools to debug and fix the broken builds. Furthermore, new debugging software tools are constantly being developed thereby resulting in new "standard" debugging tools continuously being created. The pressure for these teams to perform and stay current on these latest standard debugging tools is too daunting, even for a dedicated team of several software engineers.

As a result, there is not currently a means for easily identifying potential errors in the computer program (code) after it is built but prior to release due to the various number of software debugging tools and the extensive knowledge and experience required of the software developers of these software tools and the error messages provided by the tools.

SUMMARY

In one embodiment of the present invention, a method for identifying potential errors in a software product after it is built but prior to release comprises identifying negative log reports of previously-built software products, where the negative log reports contain errors in code in connection with building the previously-built software products. The method further comprises vectorizing language of the identified negative log reports of previously-built software products. The method additionally comprises storing the vectorized negative log reports. Furthermore, the method comprises vectorizing language of a build log report for a software product upon completion of build of the software product. Additionally, the method comprises comparing the vectorized log report with the stored vectorized negative log reports. In addition, the method comprises halting release of the software product in response to identifying a stored vectorized negative log report within a threshold degree of distance of the vectorized log report.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for identifying potential errors in a software product after it is built but prior to release. In one embodiment of the present invention, negative log reports of previously-build software products containing errors in the code in connection with building these software products are identified, such as by implementing a classification system on crowd sourced data (e.g., build logs, product documentations, and public forums). A "negative log report," as used herein, refers to a log report that includes error messages (e.g., record of critical errors that are encountered by the application, operating system or system while in operation, such as table corruption, configuration corruption, etc.). The language of the negative log reports is then vectorized. "Vectorization," as used herein, refers to transforming the language of the log reports into vector format (e.g., column vector). The vectorized negative log reports are then stored, such as in a repository. After building the repository of vectorized negative log reports, the vectorized negative log reports may be used to identify potential errors in a software product after it is built but prior to release. For example, after vectorizing the language of a build log report upon completion of a build of a software product, the vectorized log report is compared with the stored vectorized negative log reports. The release of the software product will then be halted and the software developer or programmer will receive a copy of the negative log report associated with the vectorized negative log report closest in distance to the vectorized log report if the vectorized log report is within a threshold amount of distance (e.g., Euclidean distance) to the stored vectorized negative log report. In this manner, the software developer or programmer is able to identify potential errors in the program after it is built but before it is released for public use without requiring extensive knowledge of the software debugging tools or the error messages provided by such tools.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
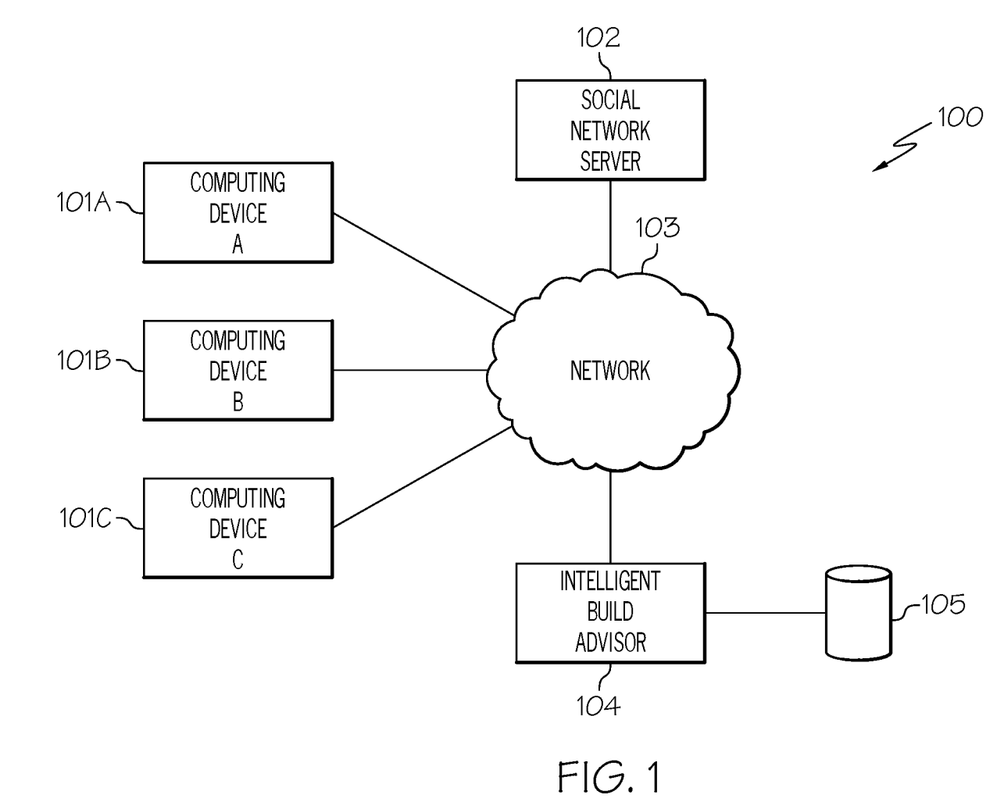
FIG. 1 illustrates a communication system for practicing the principles of the present invention in accordance with an embodiment of the present invention.

Referring now to the Figures in detail, FIG. 1 illustrates an embodiment of the present invention of a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a social network server 102 via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), laptop computer, mobile device, tablet personal computer, laptop computer, smartphone, mobile phone, navigation device, gaming unit, desktop computer system, workstation, Internet appliance and the like) configured with the capability of connecting to network 103 and consequently communicating with other computing devices 101 and social network server 102.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Social network server 102, which may be a web server configured to offer a social networking and/or microblogging service, enables users of computing devices 101 to send and read other users' posts. "Posts," as used herein, include any one or more of the following: text (e.g., comments, sub-comments and replies), audio, video images, etc. Social network server 102, as used herein, is configured to enable various collaborative activities, such as online discussion sites (e.g., public forums). Social network server 102 is connected to network 103 by wire or wirelessly. While FIG. 1 illustrates a single social network server 102, it is noted for clarity that multiple servers may be used to implement the social networking and/or microblogging service.

System 100 further includes what is referred to herein as an "intelligent build advisor" 104 connected to network 103 by wire or wirelessly. Intelligent build advisor 104 is configured to assist the software developer in identifying potential errors in a software product after it is built but prior to release without requiring the software developer to have extensive knowledge and experience of the software debugging tools or the error messages provided by these tools. Intelligent build advisor 104 identifies potential errors in the software product after it is built but prior to release utilizing vectorized negative log reports stored in a repository 105 connected to intelligent build advisor 104. As discussed in further detail below, the language of a build log report for a software product upon completion of the build of the software product is vectorized, which is then compared with the vectorized negative log reports stored in repository 105. The release of the software product is halted and the software developer or programmer is provided a copy of the negative log report associated with the vectorized negative log report closest in distance to the vectorized log report when the vectorized log report is similar to the stored vectorized negative log report within a threshold degree of distance. "Log report," as used herein, refers to computer-generated records, such as computer-generated records in connection with the operation of a program. Such log reports may include error messages (e.g., record of critical errors that are encountered by the application, operating system or system while in operation, such as table corruption, configuration corruption, etc.). Log reports that include such error messages are referred to herein as "negative log reports." The language of such negative log reports may be vectorized by intelligent build advisor 104. "Vectorization," as used herein, refers to transforming the language of the log reports into vector format (e.g., column vector). A description of the hardware configuration of intelligent build advisor 104 is provided below in connection with FIG. 2.

System 100 is not to be limited in scope to any one particular network architecture. System 100 may include any number of computing devices 101, social network servers 102, networks 103, intelligent build advisors 104 and repositories 105. Furthermore, while FIG. 1 illustrates intelligent build advisor 104 as being a separate physical device, some or all of the functionality of intelligent build advisor 104 may reside in computing device 101.

Figure 2:
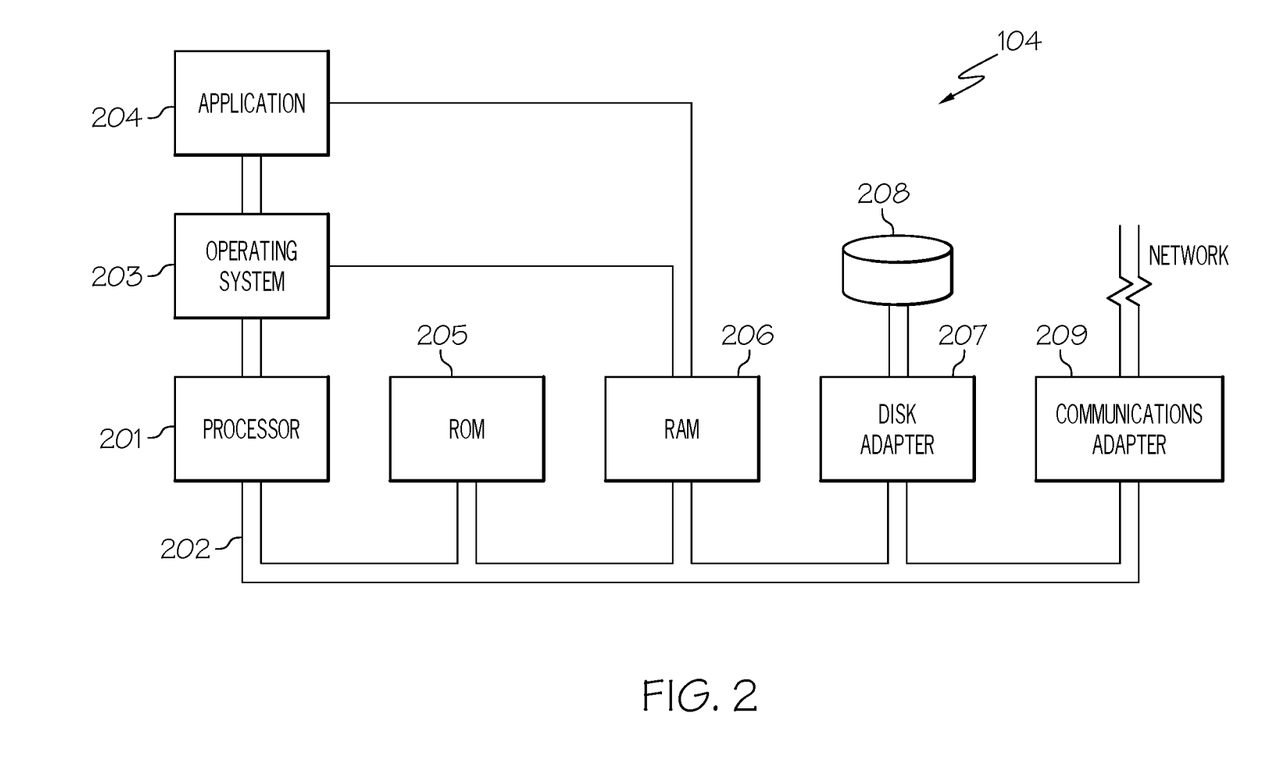
FIG. 2 illustrates an embodiment of the present invention of a hardware configuration of an intelligent build advisor which is representative of a hardware environment for practicing the present invention.

Referring now to FIG. 2, FIG. 2 illustrates a hardware configuration of intelligent build advisor 104 (FIG. 1) which is representative of a hardware environment for practicing the present invention. Referring to FIG. 2, intelligent build advisor 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for identifying potential errors in a software product after it is built but prior to release as discussed below in association with FIGS. 3-4.

Referring again to FIG. 2, read-only memory ("ROM") 205 is coupled to system bus 202 and includes a basic input/output system ("BIOS") that controls certain basic functions of intelligent build advisor 104. Random access memory ("RAM") 206 and disk adapter 207 are also coupled to system bus 202. It should be noted that software components including operating system 203 and application 204 may be loaded into RAM 206, which may be intelligent build advisor's 104 main memory for execution. Disk adapter 207 may be an integrated drive electronics ("IDE") adapter that communicates with a disk unit 208, e.g., disk drive. It is noted that the program for identifying potential errors in a software product after it is built but prior to release, as discussed below in association with FIGS. 3-4, may reside in disk unit 208 or in application 204.

Intelligent build advisor 104 may further include a communications adapter 209 coupled to bus 202. Communications adapter 209 interconnects bus 202 with an outside network (e.g., network 103 of FIG. 1) thereby allowing intelligent build advisor 104 to communicate with computing devices 101 and social network server 102.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, in building the computer program, a process referred to as "continuous integration," may be utilized in which all the software developers' changes to the computer program are tested and reported when they are added to the mainline code base, which may be several times a day. Furthermore, in connection with building the computer program, software tools may be used to debug (process of finding and resolving defects or problems within a computer program that prevent correct operation of the computer software or system) the built computer program during the continuous integration phase prior to being released. Debugging of the built computer program requires extensive knowledge and experience with such software tools by the software developers. In particular, extensive knowledge and experience is necessary to understand the tools as well as the error messages provided by the tools. The failure points become more complex as the build grows in complexity thereby typically requiring a small dedicated team or a software engineer with extensive years of experience in these environments and tools to debug and fix the broken builds. Furthermore, new debugging software tools are constantly being developed thereby resulting in new "standard" debugging tools continuously being created. The pressure for these teams to perform and stay current on these latest standard debugging tools is too daunting, even for a dedicated team of several software engineers. As a result, there is not currently a means for easily identifying potential errors in the computer program (code) after it is built but prior to release due to the various number of software debugging tools and the extensive knowledge and experience required of the software developers of these software tools and the error messages provided by the tools.

Figure 3:
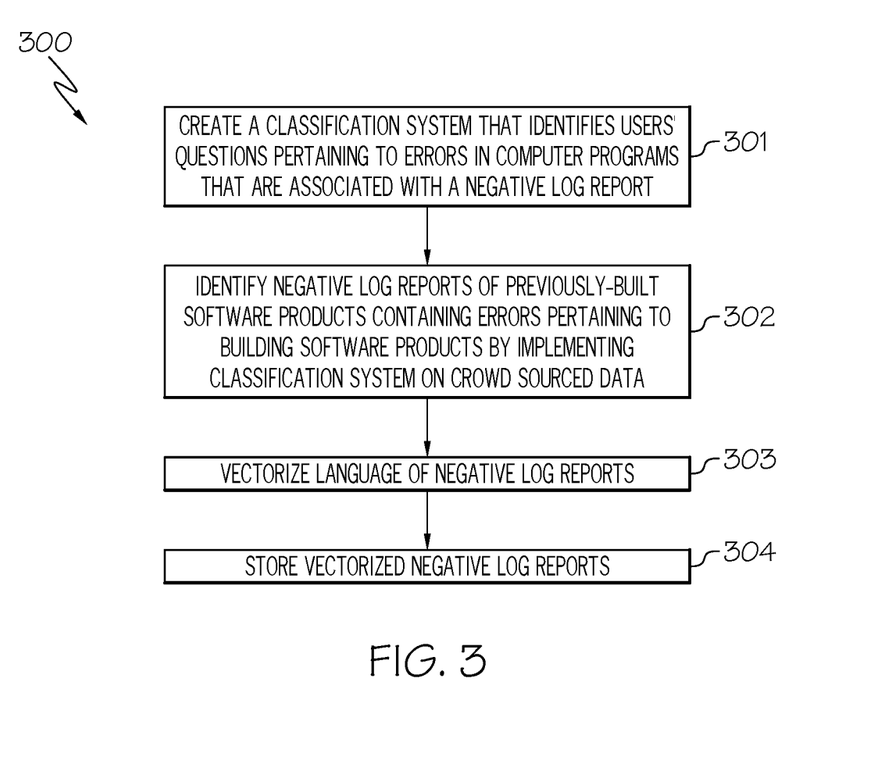
FIG. 3 is a flowchart of a method for building a repository of vectorized negative log reports in accordance with an embodiment of the present invention.
Figure 4:
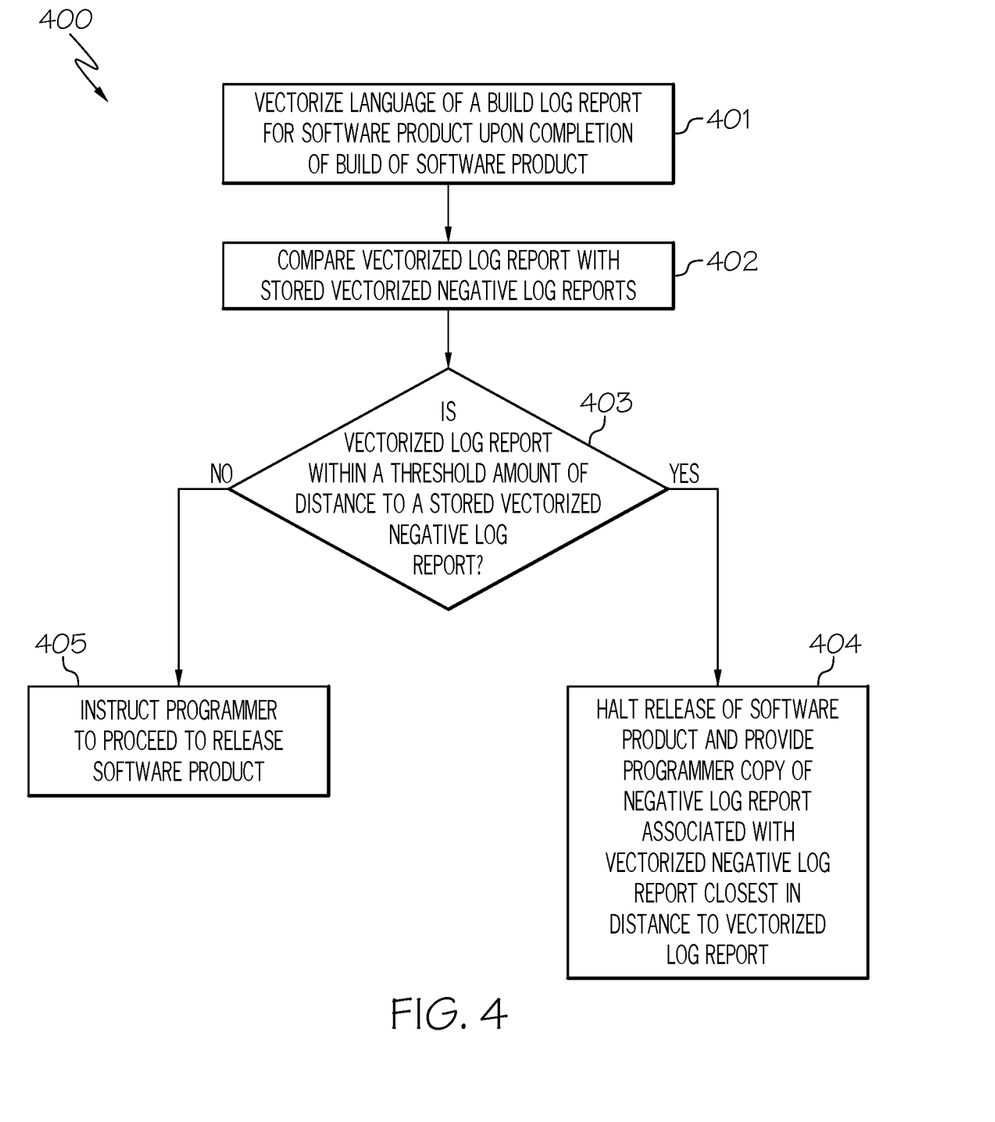
FIG. 4 is a flowchart of a method for identifying potential errors in the computer program after it is built but prior to release using the stored vectorized negative log reports in accordance with an embodiment of the present invention.

The embodiments of the present invention provide a means for identifying potential errors in the computer program (code) after it is built but prior to release due without requiring the software developers to possess extensive knowledge and experience of the software debugging tools and the error messages provided by the tools as discussed below in connection with FIGS. 3-4. FIG. 3 is a flowchart of a method for building a repository of vectorized negative log reports. FIG. 4 is a flowchart of a method for identifying potential errors in the computer program (code) after it is built but prior to release using the stored vectorized negative log reports.

As stated above, FIG. 3 is a flowchart of a method 300 for building a repository of vectorized negative log reports.

Referring to FIG. 3, in conjunction with FIGS. 1-2, in step 301, intelligent build advisor 104 creates a classification system that identifies users' questions pertaining to errors in computer programs that are associated with a negative log report. As discussed above, a "negative log report" refers to a log report that includes error messages (e.g., record of critical errors that are encountered by the application, operating system or system while in operation, such as table corruption, configuration corruption, etc.).

In one embodiment, the classification system is created by defining a collection of tags for questions pertaining to errors in code and defining a collection of tags for log reporting. For example, the classification system may be utilized to identify bug-related questions with reported logs using crowd sourced data, such as build logs, product documentations (public or private), and public forums. In connection with online and public forums, not all questions on online question and answer forums are bug-related with a log report. For instance, users can post questions about the features of the software product. As a result, embodiments of the present invention leverage various data sources (crowd sourced data) to automatically identify users' questions that are bug-related with a log report. In order to utilize the various data sources, a collection of tags that are for general bug tracking questions are defined, indicated by bug_tags={B1, B2, . . . , Bn}, and a collection of tags that are for log reporting are defined, indicated by logging_tags={L1, L2, . . . , Ln}. In one embodiment, a training example that has been labelled with bug_tags and logging_tags is treated as a positive example and a training example that is not labelled with either tags is treated as a negative example. These training examples are then used by intelligent build advisor 104 to obtain appropriate questions and related log reports utilizing natural language processing that apply the tags discussed above to the crowd sourced data. For example, intelligent build advisor 104 will be able to identify discussions in public forums regarding bug-related questions with a log report by matching the same or similar term in the discussion as listed in the collection of tags for bug tracking questions and in the collection of tags for log reporting using natural language processing.

Furthermore, in one embodiment, the classification system is created by adding textual features obtained by extracting items from the title, body, comment and answer of the crowd sourced data that co-occurs with ether the collection of tags for log reporting or the collection of tags for questions pertaining to errors in code. For example, in one embodiment, the present invention extracts the n-grams (a contiguous sequence of n items from a given sample of text or speech) from the title, body, comment and answer of the crowd sourced data to capture terms that co-occur with either bug_tags or logging_tags and then select the top number of terms (e.g., top twenty terms) as features.

Additionally, in one embodiment, the classification system is created by performing sentiment analysis on the title and body of questions of the crowd sourced data. For example, in one embodiment, intelligent build advisor 104 performs the sentiment analysis on the title and body of the questions of the crowd sourced data and calculates the sentiment scores. Sentiment analysis, as used herein, refers to the use of natural language processing, text analysis, computational linguistics, and biometrics to systematically identify, extract, quantify, and study affective states and subjective information. For example, natural language processing may be used to determine the attitude of the writer or subject of the crowd sourced data pertaining to building a software product. Such attitudes may be determined based on the types of words (e.g., good, poor) detected by intelligent build advisor 104 when analyzing the texts of bug-related questions with a log report in the crowd sourced data utilizing natural language processing. A negative sentiment or attitude towards error messages in a log report may then indicate a negative log report.

In step 302, intelligent build advisor 104 identifies negative log reports of previously-built software products containing errors pertaining to building these software products by implementing the classification system (discussed in step 301) on crowd sourced data (e.g., build logs, product documentations, and public forums). The crowd sourced data may contain public or proprietary data. Such proprietary data may be provided directly from the company who is the source of the proprietary data. Public data may be obtained online, such as via public forums, by intelligent build advisor 104 utilizing natural language processing as discussed above. In one embodiment, intelligent build advisor 104 identifies negative log reports of previously-built software products based on identifying user's questions pertaining to errors in building these software products that are associated with a log report by analyzing crowd sourced data using the classification system as discussed above. For example, negative log reports may be identified based on identifying online discussions regarding such negative log reports.

By utilizing crowd sourced data, intelligent build advisor 104 will be able to provide accurate recommendations (see steps 403-405 discussed further below) as to halt or release the software product by classifying relationships between crowd sourced data (e.g., forums, published documentations, real time build logs) with to the minute knowledge of changes in these landscapes whether they be public or proprietary to ultimately provide an immediate fix based on identifying a vectorized negative log report that is closest in distance to the vectorized log report of a recent build log report as discussed further below.

In step 303, intelligent build advisor 104 vectorizes the language of the negative log reports discovered in step 302. "Vectorization," as used herein, refers to transforming the language of the log reports into vector format (e.g., column vector). In one embodiment, the language of the negative log report is vectorized using machine learning, such as a machine learning model. For example, a machine learning model is used to map the log reports classified as bug-related from the previous model to vectors. For instance, the machine learning algorithm of Doc2vec or Word2vec could be used to vectorize the language of the negative log report into vector format. In one embodiment, the model is trained on the log corpus to create embeddings for the logs as well as trained on the underlying natural language processing filtered tokens in the log report. The vector representation of the log reports in the trained corpus is then stored with the model. After the continuous integration process is complete, the log reports of the continuous integration process are windowed in sequence in lines where the window size is varied based on the possible number of lines in a log report.

In step 304, intelligent build advisor 104 stores the vectorized negative log reports, such as in repository 105.

After building the repository of vectorized negative log reports, intelligent build advisor 104 may utilize such vectorized negative log reports to identify potential errors in a software product after it is built but prior to release as discussed below in connection with FIG. 4.

FIG. 4 is a flowchart of a method 400 for identifying potential errors in the computer program (code) after it is built but prior to release using the stored vectorized negative log reports in accordance with an embodiment of the present invention.

Referring to FIG. 4, in conjunction with FIGS. 1-3, in step 401, intelligent build advisor 104 vectorizes the language of a build log report for a software product (software program) upon completion of the build of the software product. As discussed above, "vectorization," as used herein, refers to transforming the language of the log reports into vector format (e.g., column vector). In one embodiment, the language of the build log report is vectorized using machine learning, such as a machine learning model (e.g., Doc2vec, Word2vec).

In step 402, intelligent build advisor 104 compares the vectorized log report with the stored vectorized negative log reports.

In step 403, a determination is made by intelligent build advisor 104 as to whether the vectorized log report is within a threshold amount of distance (e.g., Euclidean distance) to a stored vectorized negative log report. In one embodiment, the threshold amount of distance is user-specified.

If the vectorized log report is within a threshold amount of distance (e.g., Euclidean distance) to a stored vectorized negative log report, then, in step 404, intelligent build advisor 104 halts the release of the software product and provides the software developer or programmer a copy of the negative log report associated with the vectorized negative log report closest in distance to the vectorized log report. In one embodiment, the vectorized negative log report closest in distance to the vectorized log report corresponds to the stored vectorized negative report that is within a threshold amount of distance from the vectorized log report. However, in situations where there are multiple stored vectorized negative log reports that are within a threshold amount of distance from the vectorized log report, intelligent build advisor 104 provides the software developer or programmer a copy of the negative log report associated with one of those multiple stored vectorized negative log reports that is the closest in distance to the vectorized log report.

In this manner, the software developer or programmer is able to identify potential errors in the program after it is built but before it is released for public use without requiring extensive knowledge of the software debugging tools or the error messages provided by such tools.

Furthermore, in this manner, the functionality or capability of computing systems is improved by preventing a team of software engineers from spending time and utilizing computing resources (e.g., processing resources) in attempting to identify and understand the errors (bugs) in the code. By reducing the amount of computing resources being utilized by software developers from identifying and understanding errors in the code, computing resources (e.g., processing resource) are more efficiently utilized.

Furthermore, the present invention improves the technology or technical field involving software development. As discussed above, there is not currently a means for easily identifying potential errors in the computer program (code) after it is built but prior to release due to the various number of software debugging tools and the extensive knowledge and experience required of the software developers of these software tools and the error messages provided by the tools. The present invention improves such technology by utilizing vectorized negative log reports, which may be stored in a repository. Such negative log reports may be identified from crowd sourced data using a classification system. In one embodiment, these negative log reports are vectorized using a machine learning model. After storing these vectorized negative log reports to build a repository of vectorized negative log reports, the language of a build log report for a software product is vectorized upon completion of the build of the software product, which is then compared with the stored vectorized negative log reports. The release of the software product is halted and the software developer or programmer is provided a copy of the negative log report associated with the vectorized negative log report closest in distance to the vectorized log report when the vectorized log report is within a threshold degree of distance to the vectorized negative log report. As a result, potential errors in the program are identified after it is built but before it is released for public use without requiring extensive knowledge of the software debugging tools or the error messages provided by such tools.

Returning to step 403, if, however, the vectorized log report is not within a threshold amount of distance (e.g., Euclidean distance) to a stored vectorized negative log report, then, in step 405, intelligent build advisor 104 instructs the programmer to proceed to release the software product.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for identifying potential errors in a software product after it is built but prior to release, the method comprising:
    identifying negative log reports of previously-built software products, wherein said negative log reports contain errors in code in connection with building said previously-built software products;
    vectorizing language of said identified negative log reports of previously-built software products;
    storing said vectorized negative log reports;
    vectorizing language of a build log report for a software product to form a vectorized log report upon completion of build of said software product;
    comparing said vectorized log report with said stored vectorized negative log reports; and
    halting release of said software product in response to identifying a stored vectorized negative log report within a threshold degree of distance of said vectorized log report.

2. The method as recited in claim 1 further comprising: creating a classification system that identifies users' questions pertaining to errors in computer programs that are associated with a negative log report.

3. The method as recited in claim 2, wherein said classification system is created by defining a collection of tags for questions pertaining to errors in code and defining a collection of tags for log reporting, wherein said classification system is further created by adding textual features obtained by extracting items from a title, a body, a comment and an answer of crowd sourced data that co-occur with ether said collection of tags for log reporting or said collection of tags for questions pertaining to errors in code, wherein said classification system is further created by performing sentiment analysis on a title and a body of questions of said crowd sourced data.

4. The method as recited in claim 2 further comprising: identifying said negative log reports of previously-built software products by implementing said classification system on crowd sourced data.

5. The method as recited in claim 4, wherein said crowd sourced data comprises build logs, product documentations, and public forums.

6. The method as recited in claim 1 further comprising: providing a programmer a copy of a negative log report associated with a vectorized negative log report closest in distance to said vectorized log report in response to identifying said stored vectorized negative log report within said threshold degree of distance of said vectorized log report.

7. The method as recited in claim 1, wherein said vectorization of language of said identified negative log reports of previously-built software products and said vectorization of language of said build log report for said software product is performed using a machine learning model.

8. A computer program product for identifying potential errors in a software product after it is built but prior to release, the computer program product comprising a computer readable storage medium having program code embodied therewith, the program code comprising the programming instructions for:
    identifying negative log reports of previously-built software products, wherein said negative log reports contain errors in code in connection with building said previously-built software products;
    vectorizing language of said identified negative log reports of previously-built software products;
    storing said vectorized negative log reports;
    vectorizing language of a build log report for a software product to form a vectorized log report upon completion of build of said software product;
    comparing said vectorized log report with said stored vectorized negative log reports; and
    halting release of said software product in response to identifying a stored vectorized negative log report within a threshold degree of distance of said vectorized log report.

9. The computer program product as recited in claim 8, wherein the program code further comprises the programming instructions for:
    creating a classification system that identifies users' questions pertaining to errors in computer programs that are associated with a negative log report.

10. The computer program product as recited in claim 9, wherein said classification system is created by defining a collection of tags for questions pertaining to errors in code and defining a collection of tags for log reporting, wherein said classification system is further created by adding textual features obtained by extracting items from a title, a body, a comment and an answer of crowd sourced data that co-occur with ether said collection of tags for log reporting or said collection of tags for questions pertaining to errors in code, wherein said classification system is further created by performing sentiment analysis on a title and a body of questions of said crowd sourced data.

11. The computer program product as recited in claim 9, wherein the program code further comprises the programming instructions for:
    identifying said negative log reports of previously-built software products by implementing said classification system on crowd sourced data.

12. The computer program product as recited in claim 11, wherein said crowd sourced data comprises build logs, product documentations, and public forums.

13. The computer program product as recited in claim 8, wherein the program code further comprises the programming instructions for:
    providing a programmer a copy of a negative log report associated with a vectorized negative log report closest in distance to said vectorized log report in response to identifying said stored vectorized negative log report within said threshold degree of distance of said vectorized log report.

14. The computer program product as recited in claim 8, wherein said vectorization of language of said identified negative log reports of previously-built software products and said vectorization of language of said build log report for said software product is performed using a machine learning model.

15. A system, comprising:
a memory for storing a computer program for identifying potential errors in a software product after it is built but prior to release; and
a processor connected to said memory, wherein said processor is configured to execute the program instructions of the computer program comprising:
identifying negative log reports of previously-built software products, wherein said negative log reports contain errors in code in connection with building said previously-built software products;
vectorizing language of said identified negative log reports of previously-built software products;
storing said vectorized negative log reports;
vectorizing language of a build log report for a software product to form a vectorized log report upon completion of build of said software product;
comparing said vectorized log report with said stored vectorized negative log reports; and
halting release of said software product in response to identifying a stored vectorized negative log report within a threshold degree of distance of said vectorized log report.

16. The system as recited in claim 15, wherein the program instructions of the computer program further comprise:
creating a classification system that identifies users' questions pertaining to errors in computer programs that are associated with a negative log report.

17. The system as recited in claim 16, wherein said classification system is created by defining a collection of tags for questions pertaining to errors in code and defining a collection of tags for log reporting, wherein said classification system is further created by adding textual features obtained by extracting items from a title, a body, a comment and an answer of crowd sourced data that co-occur with ether said collection of tags for log reporting or said collection of tags for questions pertaining to errors in code, wherein said classification system is further created by performing sentiment analysis on a title and a body of questions of said crowd sourced data.

18. The system as recited in claim 16, wherein the program instructions of the computer program further comprise:
identifying said negative log reports of previously-built software products by implementing said classification system on crowd sourced data.

19. The system as recited in claim 18, wherein said crowd sourced data comprises build logs, product documentations, and public forums.

20. The system as recited in claim 15, wherein the program instructions of the computer program further comprise:
providing a programmer a copy of a negative log report associated with a vectorized negative log report closest in distance to said vectorized log report in response to identifying said stored vectorized negative log report within said threshold degree of distance of said vectorized log report.

* * * * *